F. KIEHLER.
AUXILIARY SEAT FOR AUTOMOBILES.
APPLICATION FILED SEPT. 22, 1913.

1,101,192.

Patented June 23, 1914.

2 SHEETS—SHEET 1.

Witnesses
C. L. Weed
M. P. Nichols

Inventor
Frederick Kiehler
by Seymour & Earle
Atty

F. KIEHLER.
AUXILIARY SEAT FOR AUTOMOBILES.
APPLICATION FILED SEPT. 22, 1913.
1,101,192.
Patented June 23, 1914.
2 SHEETS—SHEET 2.
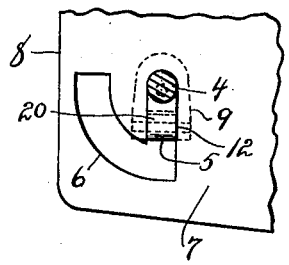
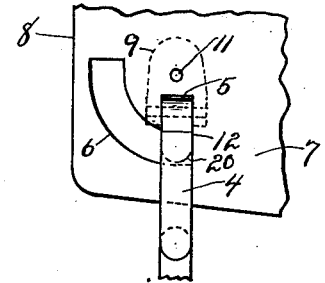
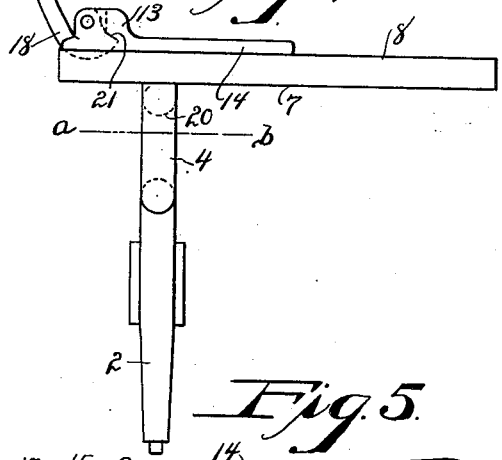
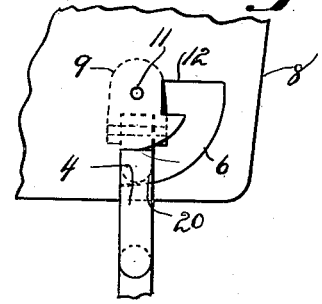
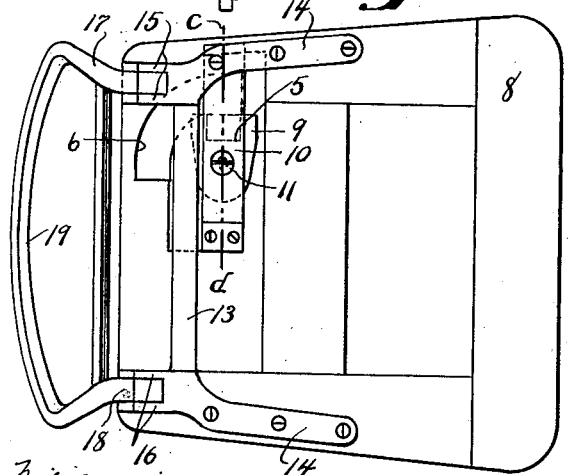
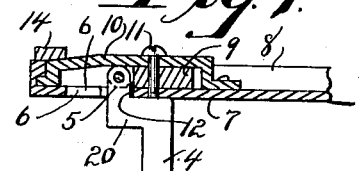

UNITED STATES PATENT OFFICE.

FREDERICK KIEHLER, OF DETROIT, MICHIGAN, ASSIGNOR TO THE ENGLISH & MERSICK CO., OF NEW HAVEN, CONNECTICUT, A CORPORATION.

AUXILIARY SEAT FOR AUTOMOBILES.

1,101,192.   Specification of Letters Patent.   Patented June 23, 1914.

Application filed September 22, 1913. Serial No. 791,111.

*To all whom it may concern:*

Be it known that I, FREDERICK KIEHLER, a citizen of the United States, residing at Detroit, in the county of Wayne and State of Michigan, have invented a new and useful Improvement in Auxiliary Seats for Automobiles; and I do hereby declare the following, when taken in connection with the accompanying drawings and the characters of reference marked thereon, to be a full, clear, and exact description of the same, and which said drawings constitute part of this application, and represent in—

Figure 1:
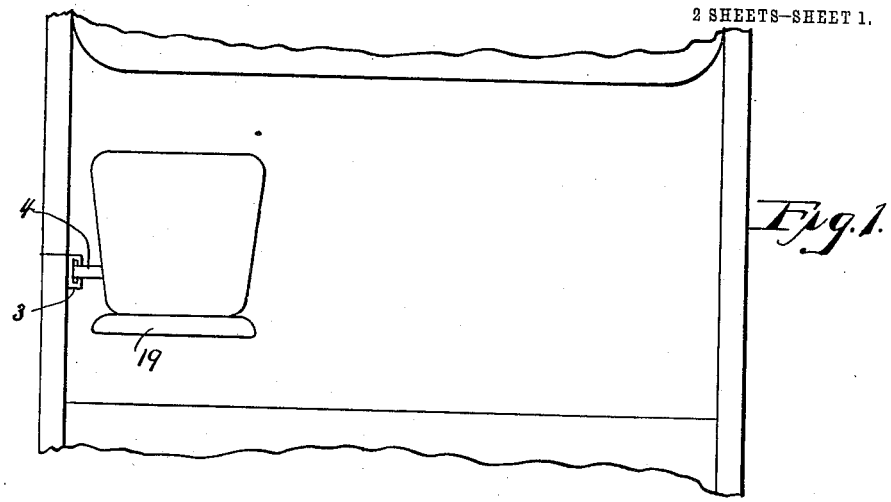
Figure 2:
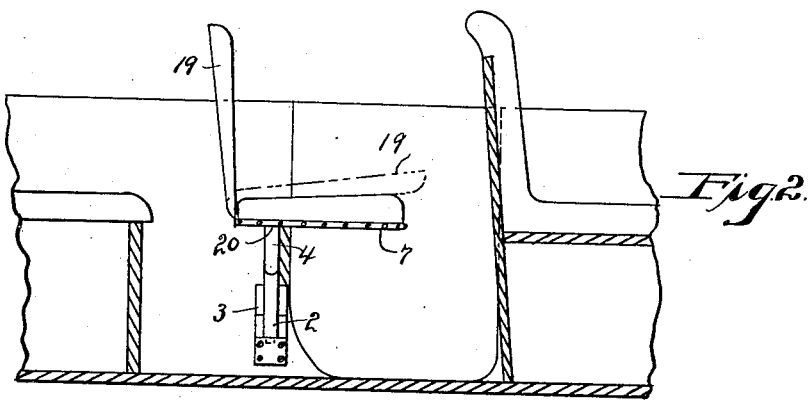
Figure 3:
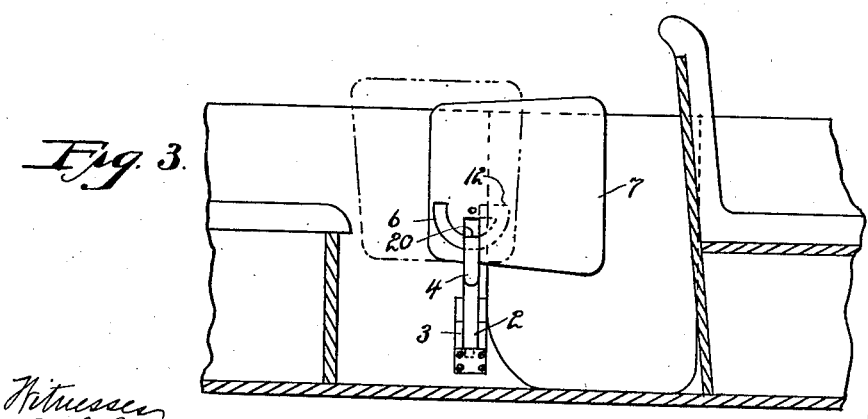

Figure 1 a top or plan view of a portion of an automobile showing one of my improved auxiliary seats located therein. Fig. 2 a broken side view showing the seat in the open position and with the back folded, in broken lines. Fig. 3 a similar view with the seat turned up against the side and in the completed retired position, in broken lines. Fig. 4 a side view of the seat detached, with the upholstery omitted. Fig. 5 a top or plan view of the same. Fig. 6 an underside view looking upward from the line $a$—$b$ of Fig. 4. Fig. 7 a broken side view with the seat turned up, as shown in full lines in Fig. 3. Fig. 8 a similar view in the completely retired position, and as shown in broken lines in Fig. 3. Fig. 9 a sectional view on the line $c$—$d$ of Fig. 5. Fig. 10 a similar view with the seat turned up in the second position.

This invention relates to an improvement in auxiliary seats for automobiles, and especially for touring cars, limousines, etc. In most cars these auxiliary seats when in their open position are so located that they must be folded back when one enters or leaves the car, and the backs are rigid with the seat.

The object of this invention is the simple construction of an auxiliary seat which may be provided with a folding seat back which will not interfere with the upholstery, permitting the seat to be finished complete, and which provides for locking the seat in a folded or retired position and clear of the door opening; and the invention consists in the construction hereinafter described and particularly recited in the claim.

In carrying out my invention, I employ a post 2 which may be mounted in any suitable bracket 3. The upper end 4 of the post is offset and formed with an upwardly projecting finger 5 which enters a segmental slot 6 formed in a plate 7 in the under face of the seat-frame 8. This finger is pivotally connected with a block 9 located between the plate 7 and a yoke 10 which block is free to turn upon a stud or bolt 11. At one end of the segmental slot 6 is a notch 12 for the purpose as will hereinafter appear. Secured to the top face of the seat frame 8 is a hinge plate 13 provided at opposite ends with arms 14 by which the plate is secured to the frame, and on opposite sides of the frame near the rear edge are ears 15 and 16 between which are pivoted the lower ends 17 and 18 of the back-frame 19, and these lower ends 17 and 18 are curved about a line struck from the center of the pivot so that the seat may be upholstered around the lower ends of the back-frame and the back-frame be free to turn without interfering with the upholstery as the arc described by the back-frame is always concentric with the pivot. The bends at the lower ends of the back-frame form stops 21 which strike the underside of the plates 13 and 14 limiting the backward movement of the back. When the seat is down in position for use, the seat frame rests upon the upper end 20 of the offset 4. When it is desired to fold or retire the seat the back 19 is turned down as shown in broken lines in Fig. 2, and the seat and frame then turned upward toward the side of the car as shown in full lines in Fig. 3, the notch 12 permitting the seat to turn on the upright finger 5; or, in other words, it permits the end 20 to enter the path of the segmental slot 6. The seat is then rotated on the stud or bolt 11, making a quarter turn to the position shown in broken lines in Fig. 3, and as clearly shown in Fig. 8. The seat is then folded closely against the side of the car and almost entirely in rear of the rear door post. To place the seat in use the operation above described is reversed.

I claim:—

An auxiliary seat for automobiles, comprising a post formed at its upper end with an offset and an upwardly extending finger, a seat-frame provided with a segmental slot into which the finger extends, and a notch at one end thereof, a block pivotally connected with the seat frame and pivotally connected with said finger whereby the seat may be turned into a vertical position and partially rotated.

In testimony whereof, I have signed this specification in the presence of two subscribing witnesses.

FREDERICK KIEHLER.

Witnesses:
W. A. EVANS,
E. BOWEN.

Copies of this patent may be obtained for five cents each, by addressing the "Commissioner of Patents, Washington, D. C."